UNITED STATES PATENT OFFICE.

BART KANE, OF CINCINNATI, OHIO.

FACING COMPOUND FOR MOLDS.

SPECIFICATION forming part of Reissued Letters Patent No. 8,763, dated June 14, 1881.

Original No. 147,138, dated February 3, 1874. Application for reissue filed November 10, 1880.

*To all whom it may concern:*

Be it known that I, BART KANE, of Cincinnati, Hamilton county, Ohio, have invented a certain new and useful Improvement in Facing Compounds for Molds for Casting Iron; of which the following is a specification.

This invention relates to that class of compounds used in dusting that portion of the face of the mold that comes in contact with the molten iron in the process of casting. It is applied through the medium of a dust-bag.

The object of my invention is to produce a smooth fire-proof surface upon the face of the mold, and to insure the production of clean castings having the desired iron color. Its object is also to provide a compound that will not necessitate the use of a "return-facing."

My first object is attained by the use of fire-clay and carbon, and my second object by adding to this mixture manganese as a third ingredient. The properties of each ingredient, the function of each when combined, and the results of their combination when applied are as follows: Carbon has the scaling property which prevents the molding-sand from adhering to the iron, and also of imparting the iron color to the casting. It is therefore evident that if it were practicable to face a mold with carbon alone the best results would be attained; but carbon is destitute of the property of attracting moisture from the molding-sand, so as to cause it (the carbon) to adhere to the mold. Consequently the flow of the liquid iron washes it along the surface of the mold, exposing the sand, which is burned into the casting, giving it a rough surface. To prevent the carbon from "washing" I mix fire-clay with it. The clay, having like scaling properties, (being refractory,) has also the property of attracting moisture from the sand sufficient to hold it and the carbon with which it is mixed in place, thus rendering the face of the mold fire-proof—a result not accomplished by any facing heretofore in use. After the mold has been faced or dusted, the pattern is returned to the mold to press down the facing and make a smooth surface upon the face of the casting. This necessarily excludes the air from between the pattern and the mold. With the compounds ordinarily used, (and with mine when only fire-clay and carbon are used,) should the pattern be lifted out, there being no atmospheric pressure against the facing from above, but a pressure from beneath through the sand, portions of the thin layer of facing may adhere to, and be lifted out with, the pattern, thus spoiling the face of the mold. This is counteracted by using a return-facing, which is applied on top of the facing before the pattern is returned. This prevents the complete exhaustion of air, by furnishing a medium through which it is supplied by circulation between the particles of the return-facing to the space between the pattern and the mold in such quantities as are required.

When it is desirable to avoid the necessity of using a return-facing, I mix manganese with the fire-clay and carbon. This with the other ingredients assists the moisture and atmosphere in making all adhere to the mold, and by its inherent properties prevents the formation of a vacuum between the pattern and mold, and thus prevents the facing from adhering to the pattern.

When the three ingredients are to be compounded for use without a return-facing, the best proportions are: three (3) parts of fire-clay, two (2) parts of manganese, and five (5) parts of carbon, by weight. When the compound is intended for use with a return-facing it is only necessary to use sufficient of the fire-clay to "fix" the carbon or prevent it from washing when the fluid metal is poured into the mold.

As I am the first discoverer of the advantages arising from the use of fire-clay in a facing compound, I do not limit myself to its use in any exact proportion; but the proportions above given, when used with manganese, I have found to give the best results. When the manganese is omitted from the compound its place may be supplied by an equal amount of carbon, as three parts of the fire-clay will be sufficient to fix seven parts of the carbon, or seven parts of carbon and other ingredients, such as manganese.

In preparing my facing I find it best to first mix the ingredients and then grind them together to a fine powder; but they may be pulverized separately and mixed afterward.

My invention has nothing to do with blackwashes, or wet blackings, or wet blackenings, and for all I care wet substances of this character may have been compounded wholly of refractory clay and carbonaceous ingredients before my invention of the facing (which is a dry powder) compounded of refractory clay and carbon, whether combined with manganese or not.

I claim—

1. The combination of fire-clay and carbon as a foundry-facing, prepared substantially as specified.

2. The combination of fire-clay, manganese, and carbon to be used as a foundry-facing, prepared substantially as described.

BART KANE.

Witnesses:

L. H. PUMMILL,

ED G. DEWALD.